April 29, 1941.   C. W. NIXON   2,239,928
ELECTRIC LAMP
Filed May 15, 1939
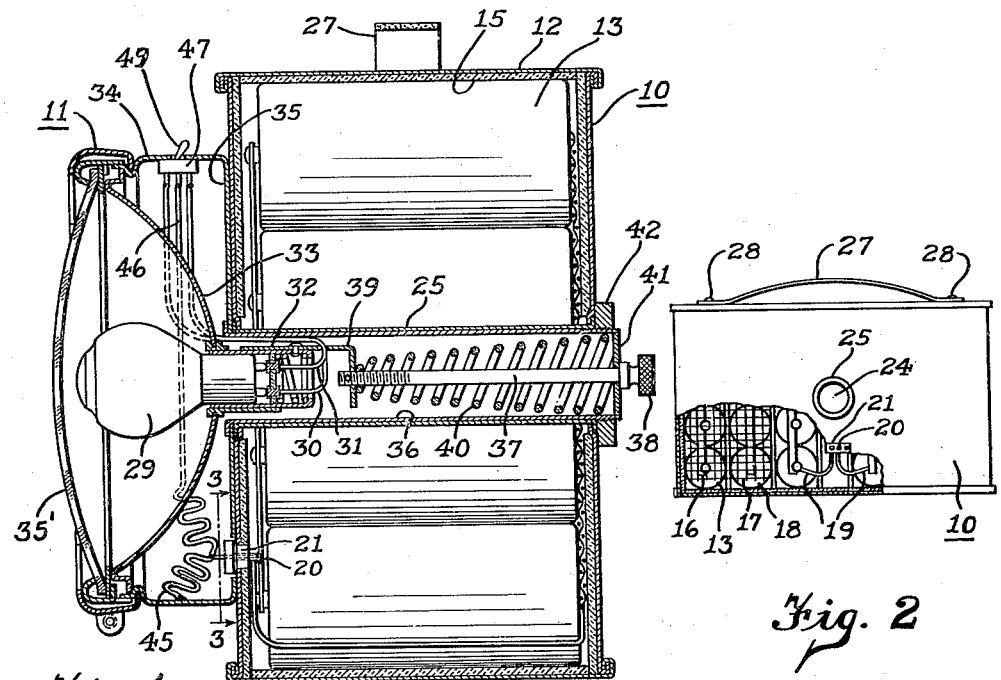
Fig. 1    Fig. 2
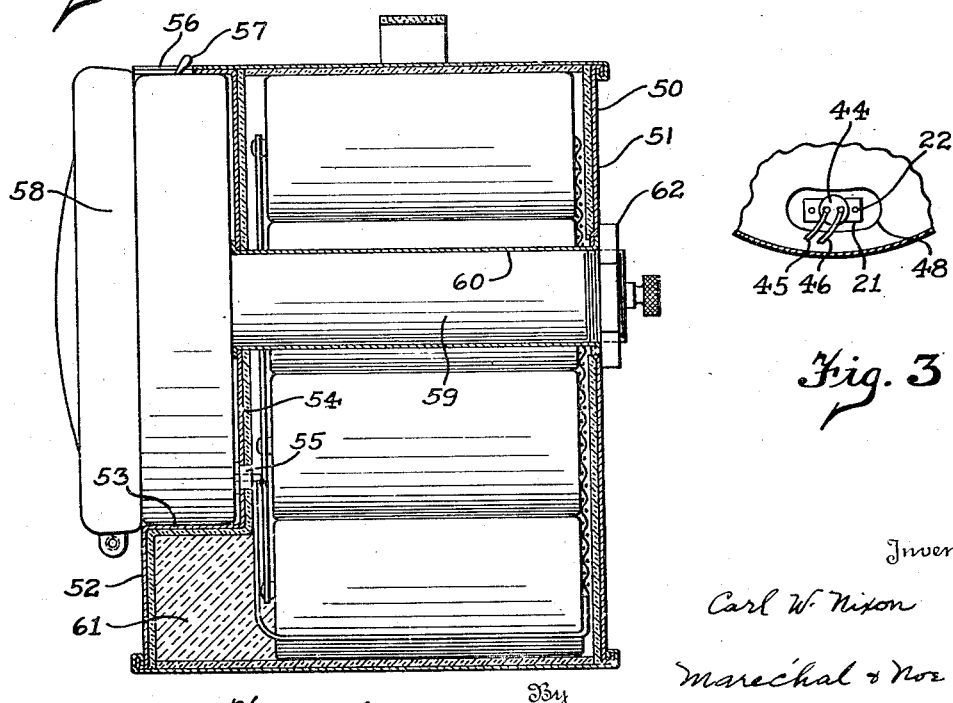
Fig. 3
Fig. 4
Inventor
Carl W. Nixon
Marechal & Noe
Attorney Patented Apr. 29, 1941

2,239,928

UNITED STATES PATENT OFFICE 2,239,928

ELECTRIC LAMP

Carl W. Nixon, Dayton, Ohio, assignor to The S. H. Thomson Manufacturing Company, Dayton, Ohio, a corporation of Ohio Application May 15, 1939, Serial No. 273,682

4 Claims. (Cl. 240—10.61)

This invention relates to electric lamps and more particularly to battery-operated lamps of a portable character.

One object of the invention is the provision of a portable battery-operated lamp including a battery unit and a lamp unit that are adapted to be attached and detached, the battery unit having a passage extending from one side wall thereof and providing a space in which at least a portion of the lamp unit is supported.

Another object of the invention is the provision of a portable battery-operated lamp in which the lamp is recessed in a passage provided by the battery, so that the battery forms a support for the lamp without requiring any additional mounting or supporting means for the battery or the lamp.

Another object of the invention is the provision of a portable electric lamp including a battery providing a unitary permanent assemblage of battery cells arranged in a common enclosing casing which is provided with a passage arranged between some of the cells of the battery and adapted for the reception and support of a portion of the lamp which is electrically connected to the positive and negative sides of the battery.

Another object of the invention is the provision of a battery having a number of cells permanently enclosed in a supporting casing which is provided with a passage extending from one side of the battery between some of the cells and adapted for the reception and support of a portion of a lamp.

Other objects and advantages of the invention will be apparent from the following description, the accompanying drawing and the appended claims.

In the drawing,

Fig. 1 is a vertical section through a portable battery and lamp assemblage embodying the present invention;

Fig. 2 is a front elevation of the battery, a portion of its casing being broken away for purposes of illustration;

Fig. 3 is a section on the line 3—3 of Fig. 1; and

Fig. 4 is a vertical sectional view of a lamp and battery assemblage in which a large part of the reflector-enclosing portion of the lamp housing is arranged within the confines of the battery.

Referring more particularly to the drawing, in which preferred embodiments of the invention have been illustrated, 10 generally designates a battery, and 11 generally designates an electric lamp which is detachably carried by the battery with at least a portion of the lamp arranged within and supported by the battery and providing a compact assemblage which may be conveniently carried about. With the battery itself receiving and partly housing the lamp there is no requirement for an additional mounting or supporting device for securing the lamp and battery together, and the construction is therefore of comparatively small weight in proportion to the power of the battery and the amount of light that can be obtained.

The battery 10 comprises a casing 12 which encloses an assemblage of cells 13 so as to provide a unitary permanent cell assemblage. The casing 12 is preferably of sheet metal, including top and bottom walls and four vertically extending side and end walls which are permanently fixed together and provide a waterproof enclosure. Between the dry cells of the battery and the casing 12 and between adjacent rows of cells are spacing sheets 15 of paperboard or the like, and the spaces between the cells and the insulation sheets may be filled with sealing and insulation compound.

As shown in Figs. 1 and 2, there are several rows of cells, the particular battery illustrated having 24 horizontally extending cells connected in parallel in sets of 4, and with the 6 sets connected in series with one another so as to give about 9 volts. The carbon electrodes 16 of one vertical row of cells, as shown in Fig. 2, are connected by a wire screen 17 to the zinc casings 18 of the next row which is also connected by wire screening at the opposite end to the next succeeding row, the two end rows being electrically connected by a wire extending from one to the other. Wires 19 extend from the two inner rows of cells to two connection terminals 20 of a female connection strip 21 which is preferably a sheet of insulating material held by rivets or the like 22 on one of the side walls of the casing, and provided with prong receiving sockets.

The battery is provided with a passage 24 which extends from a side of the battery and provides a space in which a substantial portion of the lamp 11 is supported and carried. In the form of the invention shown in Figs. 1 and 2 the passage 24 extends from one side of the battery to the other and is of uniform diameter. This passage is provided by a metal tube 25 which is connected at its opposite ends to the side walls of the casing, and arranged between some of the cells, which have their two inner rows suitably spaced apart, as will be apparent from Fig. 2, to provide a space for the tube.

A suitable carrying handle such as the fabric strap 27, the ends of which are connected by rivets 28 or the like to the top wall of the battery casing, provides means by which the battery can be conveniently carried about.

The lamp 11 includes the lamp bulb 29 which is preferably of the double filament type, one filament being connected to the lead 30 and the other filament to the lead 31. The bulb is mounted in a sleeve 32 which is carried by the parabolic reflector 33, the reflector being supported at its outer or peripheral edge in the sheet metal housing portion 34. The housing also carries a glass or lens 35'.

The housing portion 34, which is arranged exteriorly at one side of the battery in the form of the invention shown in Figs. 1 and 2, is preferably in the form of a short cylinder having a rear wall 35 which abuts against the side of the casing of the battery. Fixed to the rear wall 35 is a cylindrical extension or projection 36 which forms the part of the lamp housing that is received in and carried by the battery. Within the extension portion 36 is a focus-adjusting screw 37 operated by knob 38, one end of the screw being in threaded engagement with a bracket 39 which is attached to the bulb-supporting sleeve 32, and which provides for the longitudinal adjustment of the lamp bulb with respect to the reflector. A spring 40 maintains the knob 38 against the end wall 41 of the extension portion 36 of the housing.

In the form of the invention shown in Figs. 1 and 2, the extension portion of the housing passes entirely through the passage in the battery and projects a little distance beyond the side of the battery casing, its end portion being threaded to receive a holding nut 42 which engages against the side of the battery casing and thus holds the lamp in its mounted position. As will be apparent, the screw 42 may be screwed off of the end of the portion 36 of the lamp and the lamp can then be readily removed as a unit from the battery so that when the battery is exhausted it may be discarded and replaced by a fresh battery.

The electrical connection between the lamp and the battery is established by means of a male connection plug 44 the terminal prongs of which are connected by wires 45 and 46 to the metal housing 34 and to a three-way toggle switch 47. The connection plug 44 is preferably carried by the lamp merely by the wires 45 and 46 which are long enough to afford a considerable movement of the plug with respect to the lamp housing so that the plug may be engaged with the connection member on the battery before the lamp is positioned on the battery. The connection plug 44 will then be received in an opening 48 in the rear wall 35 of the lamp when the lamp is moved to its intended position. This opening 48 is considerably larger than the plug so that an electrical connection between the lamp and the battery may be established in spite of manufacturing variations as to distance between the center of the passage 24 and the location of the female connection 21 of the battery.

The toggle switch 47 which is preferably provided at the top of the lamp where it may be conveniently accessible, has a handle 49 which opens the circuit from the battery to the bulb when the handle is upright, and which may be moved to opposite sides of its normal position to connect the battery to the lead 30 or to the lead 31 for the selective energization of the filaments. One side of each of the filaments connects to the bulb supporting sleeve which is grounded to the lamp housing. Upon energization of the large capacity filament, which may be capable of producing about 21 candle power, for example, an intense searchlight beam of great length is obtained, and when the smaller capacity filament of a few candle power is used, a service light is provided which may be maintained for a great many hours before the battery is exhausted. After the battery is exhausted it is of course a simple matter to dismount the lamp as an assembled unit, and connect it to another similar battery, merely by operation of the holding nut 42 and the connection plug 44.

With a lamp equipped with focusing means operated from the rear side of the housing the passage of the battery extends completely from one side of the battery to the other although that would not be necessary if the focusing means is omitted. However, in accordance with the present invention the battery is provided with a passage or chamber open on at least one side of the battery and adapted for the reception of some substantial portion of the lamp housing, and as shown in Fig. 4 the battery may be so constructed as to receive the large diameter portion of the housing in which the reflector is arranged. In this form of the invention the passage in the battery has an enlarged portion in which the larger portion of the lamp housing is recessed with only a comparatively small part of this housing portion projecting from one side of the battery. The battery 50, which may be of the same length and height as the battery 10 and of generally similar construction, is provided with a metal casing 51 which is of greater width in the direction of the longitudinal axes of the cells than the battery 10, so that there is sufficient space within the confines of the battery casing adjacent the ends of some of the cells for the reception of the larger portion of the lamp housing. The side wall 52 of the casing of the battery is recessed as indicated at 53, the inner wall portion 54 serving for the support of the insulation connection strip 55 on which the female connection sockets, attached to the battery cells, are carried. The top wall of the battery is provided with a recess or notch 56 through which the switch handle 57 of the lamp projects, the upper top of the lamp being immediately below the top wall of the battery casing. The lamp 58 may be the same in construction as the lamp 11, having a cylindrical housing extension portion 59 which is received in the passage 60 of the battery, the cellular arrangement of the battery being the same as in the housing 10 except that the additional space between the ends of the cells and the wall 52 of the battery casing is filled with insulation compound as indicated at 61. Any suitable means may be provided for securing the enlarged housing portion of the lamp in position in a readily detachable manner although in this form of the invention the same sort of a holding device, including a nut 62, has been shown as in the form illustrated in Figs. 1 and 2.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A portable electric lamp comprising a battery having a number of cells permanently enclosed in a surrounding casing, said casing having a tubular member extending therethrough from one side of the battery to the other and providing a passage between some of the cells, and a lamp carried by said battery and adapted to be readily attached and detached as a unit, said lamp comprising a lamp bulb and a bulb housing supporting said bulb and having a portion fitting within the tubular portion of the battery and supported thereby with one part of the bulb housing on one side of the battery and with an opposite part projecting from the opposite side of the battery, and means engaging the projecting part for detachably retaining the lamp in position on the battery.

2. A portable electric lamp comprising a battery having a number of cells and a sheet metal casing providing permanently connected top, bottom and side walls permanently enclosing the cells, said battery having a tubular wall extending from one side wall to the other and providing a passage extending through the battery between some of the cells, a carrying handle on the battery casing, connection means on a side wall of the casing adjacent one end of the passage, and a lamp carried by said battery and adapted to be readily attached and detached as a unit, said lamp comprising a lamp bulb and a bulb housing supporting said bulb and having a portion extending through the passage of the battery and also having an electrical connection means adapted for connection to the connection means of the battery.

3. A portable electric lamp comprising a battery having a number of horizontally arranged cells and a casing providing permanently connected top, bottom and side walls permanently enclosing the cells, said battery having a tubular wall extending horizontally from one side wall to the other and providing a cylindrical passage extending from one side of the battery to the other between some of the cells, a carrying handle on the top of the battery casing, a connection socket fixed to a side wall of the casing adjacent one end of the passage, and a lamp carried by said battery and adapted to be readily attached and detached as a unit, said lamp comprising a lamp bulb, a reflector and a bulb housing supporting said bulb and reflector and having a cylindrical portion extending through and supported by the passage of the battery and also having a connection plug adapted for connection to the socket of the battery.

4. A portable electric lamp comprising a battery having a number of cells permanently enclosed in a surrounding casing and providing a unitary cell assemblage, said battery having a passage extending therethrough between some of the cells, and a lamp carried by said battery and adapted to be readily attached and detached as a unit and comprising a lamp bulb, a reflector and a bulb housing having an extension fitting within and supported by the passage of the battery and projecting from the opposite side thereof, focusing means in said extension for relatively adjusting the lamp bulb with respect to the reflector, means at the end of said housing extension operable to secure the same in attached position on the battery, and means for electrically connecting the bulb and the battery.

CARL W. NIXON.